(12) United States Patent
Leong et al.

(10) Patent No.: US 11,163,813 B2
(45) Date of Patent: *Nov. 2, 2021

(54) PROVIDING A THUMBNAIL IMAGE THAT FOLLOWS A MAIN IMAGE

(71) Applicant: Google LLC, Mountain View, CA (US)

(72) Inventors: Su Chuin Leong, South San Francisco, CA (US); Daniel Caleb Gordon, Marietta, GA (US); Jonathan Siegel, San Francisco, CA (US); Andrew Vytas Kisielius, San Francisco, CA (US); Aaron Michael Donsbach, Seattle, WA (US)

(73) Assignee: Google LLC, Mountain View, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 15/900,924

(22) Filed: Feb. 21, 2018

(65) Prior Publication Data

US 2018/0181568 A1 Jun. 28, 2018

Related U.S. Application Data

(63) Continuation of application No. 14/258,709, filed on Apr. 22, 2014, now Pat. No. 9,934,222.

(51) Int. Cl.
*G06F 3/048* (2013.01)
*G06F 16/40* (2019.01)
(Continued)

(52) U.S. Cl.
CPC .......... *G06F 16/40* (2019.01); *G06F 3/04817* (2013.01); *G06F 16/587* (2019.01);
(Continued)

(58) Field of Classification Search
CPC .... G06F 16/40; G06F 16/587; G06F 16/5866; G06F 16/04817; G06F 9/451
See application file for complete search history.

(56) References Cited

U.S. PATENT DOCUMENTS 5,710,875 A 1/1998 Harashima et al.
5,754,174 A 5/1998 Carpenter et al.
(Continued)

FOREIGN PATENT DOCUMENTS

CN 102661748 A 9/2012
EP 1703426 A1 9/2006

OTHER PUBLICATIONS

Kim et al., "A unified visualization framework for spatial and temporal analysis in 4D GIS", Proceedings of 2003 IEEE International Geoscience and Remote Sensing Symposium, v. 6, pp. 3715-3717, 2003. (Year: 2003).*

(Continued)

*Primary Examiner* — Xuyang Xia
(74) *Attorney, Agent, or Firm* — Lerner, David, Littenberg, Krumholz & Mentlik, LLP

(57) ABSTRACT

The technology relates to selecting and displaying images captured at different points in time. As an example, a user of a computing device may view a first street level image as viewed from a particular location and oriented in a particular direction. The user may select other time periods for which similar images are available. Upon selecting a particular time period, a second street level image may be displayed concurrently with the first street level image, wherein the second street level image was captured on or around the selected time period. If the user changes the perspective of the first image an automatic change in perspective of the second image may occur.

17 Claims, 8 Drawing Sheets

(51) Int. Cl.
*G06F 3/0481* (2013.01)
*G06F 16/58* (2019.01)
*G06F 16/587* (2019.01)
*G06F 9/451* (2018.01)

(52) U.S. Cl.
CPC .......... *G06F 16/5866* (2019.01); *G06F 3/048* (2013.01); *G06F 9/451* (2018.02)

(56) References Cited

U.S. PATENT DOCUMENTS

| | | | |
|---|---|---|---|
| D399,501 S | 10/1998 | Arora et al. | |
| 5,832,173 A | 11/1998 | Terasawa et al. | |
| D406,123 S | 2/1999 | Hodgson | |
| 5,912,165 A | 6/1999 | Cabib et al. | |
| D418,495 S | 1/2000 | Brockel et al. | |
| D424,543 S | 5/2000 | Hodgson | |
| 6,075,595 A | 6/2000 | Malinen | |
| 6,177,932 B1 | 1/2001 | Galdes et al. | |
| 6,373,568 B1 | 4/2002 | Miller et al. | |
| 6,448,956 B1 * | 9/2002 | Berman ............... | G06F 3/0481 345/156 |
| D464,360 S | 10/2002 | Grundel et al. | |
| 6,504,571 B1 | 1/2003 | Narayanaswami et al. | |
| D471,225 S | 3/2003 | Gray | |
| 6,769,131 B1 | 7/2004 | Tanaka et al. | |
| 6,895,126 B2 | 5/2005 | Di Bernardo et al. | |
| 7,009,699 B2 | 3/2006 | Wolleschensky et al. | |
| D523,442 S | 6/2006 | Hiramatsu | |
| D525,632 S | 7/2006 | Jost et al. | |
| D536,340 S | 2/2007 | Jost et al. | |
| 7,225,207 B1 | 5/2007 | Ohazama et al. | |
| D550,236 S | 9/2007 | Armendariz | |
| D555,664 S | 11/2007 | Nagata et al. | |
| D557,272 S | 12/2007 | Glaser et al. | |
| D558,220 S | 12/2007 | Maitlen et al. | |
| D561,191 S | 2/2008 | Haning et al. | |
| D561,193 S | 2/2008 | O'Mullan et al. | |
| D563,975 S | 3/2008 | Vigesaa | |
| D566,716 S | 4/2008 | Rasmussen et al. | |
| 7,353,114 B1 | 4/2008 | Rohlf et al. | |
| D571,819 S | 6/2008 | Scott et al. | |
| D572,719 S | 7/2008 | Beamish et al. | |
| 7,398,156 B2 | 7/2008 | Funato | |
| D574,388 S | 8/2008 | Armendariz et al. | |
| D578,544 S | 10/2008 | Nathan et al. | |
| D593,578 S | 6/2009 | Ball et al. | |
| D595,304 S | 6/2009 | Rasmussen et al. | |
| 7,561,169 B2 | 7/2009 | Carroll | |
| D599,812 S | 9/2009 | Hirsch | |
| D601,165 S | 9/2009 | Truelove et al. | |
| D601,166 S | 9/2009 | Chen et al. | |
| D602,495 S | 10/2009 | Um et al. | |
| D605,657 S | 12/2009 | Danton | |
| D606,551 S | 12/2009 | Willis | |
| 7,720,359 B2 | 5/2010 | Koyanagi et al. | |
| RE41,428 E | 7/2010 | Mayer et al. | |
| D619,614 S | 7/2010 | O'Mullan et al. | |
| D620,950 S | 8/2010 | Rasmussen | |
| 7,840,032 B2 | 11/2010 | Ofek | |
| 7,912,634 B2 | 3/2011 | Reed et al. | |
| 7,921,108 B2 | 4/2011 | Wang et al. | |
| 7,971,155 B1 | 6/2011 | Yoon | |
| D642,195 S | 7/2011 | Marks et al. | |
| 7,983,489 B2 | 7/2011 | Aguera y Arcas et al. | |
| D645,052 S | 9/2011 | Rasmussen | |
| D645,470 S | 9/2011 | Matas | |
| 8,064,633 B2 | 11/2011 | Noda et al. | |
| 8,077,918 B2 | 12/2011 | Kirmse et al. | |
| 8,085,990 B2 | 12/2011 | Ofek | |
| D652,053 S | 1/2012 | Impas et al. | |
| 8,090,714 B2 | 1/2012 | Yang et al. | |
| 8,103,081 B2 | 1/2012 | Gossage et al. | |
| 8,145,703 B2 | 3/2012 | Frishert et al. | |
| D656,950 S | 4/2012 | Shallcross et al. | |
| 8,155,391 B1 | 4/2012 | Tang et al. | |
| D661,702 S | 6/2012 | Asai et al. | |
| D661,704 S | 6/2012 | Rasmussen | |
| 8,213,749 B2 | 7/2012 | Di Bernardo et al. | |
| D664,983 S | 8/2012 | Moreau et al. | |
| D665,409 S | 8/2012 | Gupta et al. | |
| D667,432 S | 9/2012 | Phelan | |
| D667,834 S | 9/2012 | Coffman et al. | |
| D667,840 S | 9/2012 | Anzures | |
| 8,274,524 B1 | 9/2012 | Cornell et al. | |
| 8,302,007 B2 | 10/2012 | Barcay et al. | |
| 8,339,394 B1 | 12/2012 | Lininger | |
| 8,352,465 B1 | 1/2013 | Jing et al. | |
| D682,842 S | 5/2013 | Kurata et al. | |
| D682,876 S | 5/2013 | MacNeil | |
| D683,356 S | 5/2013 | Rally | |
| 8,447,136 B2 | 5/2013 | Ofek et al. | |
| D684,161 S | 6/2013 | Truelove et al. | |
| D684,167 S | 6/2013 | Yang et al. | |
| 8,510,041 B1 | 8/2013 | Anguelov et al. | |
| D689,072 S | 9/2013 | Park et al. | |
| D689,079 S | 9/2013 | Edwards et al. | |
| D689,082 S | 9/2013 | Stiffler | |
| D689,085 S | 9/2013 | Pasceri et al. | |
| D689,089 S | 9/2013 | Impas et al. | |
| 8,543,323 B1 | 9/2013 | Gold et al. | |
| D690,737 S | 10/2013 | Wen et al. | |
| D692,450 S | 10/2013 | Convay et al. | |
| D696,279 S | 12/2013 | Bortman et al. | |
| D696,285 S | 12/2013 | Hally | |
| 8,610,741 B2 | 12/2013 | Szeliski et al. | |
| 8,649,663 B2 | 2/2014 | Saitou et al. | |
| D701,879 S | 4/2014 | Foit et al. | |
| D701,882 S | 4/2014 | Soegiono et al. | |
| 8,711,174 B2 | 4/2014 | Fialho et al. | |
| D706,822 S | 6/2014 | Wang | |
| D708,638 S | 7/2014 | Manzari et al. | |
| 8,791,983 B2 | 7/2014 | Shikata | |
| 8,817,067 B1 | 8/2014 | Fan et al. | |
| D712,920 S | 9/2014 | Sloo et al. | |
| D713,853 S | 9/2014 | Jaini et al. | |
| D715,316 S | 10/2014 | Hemeon et al. | |
| D715,820 S | 10/2014 | Rebstock | |
| D715,836 S | 10/2014 | Huang et al. | |
| 8,872,847 B2 | 10/2014 | Nash et al. | |
| D716,827 S | 11/2014 | Dowd | |
| 8,893,026 B2 | 11/2014 | Lindemann et al. | |
| D719,186 S | 12/2014 | Kim | |
| 8,928,691 B2 | 1/2015 | Maurer et al. | |
| 8,930,141 B2 | 1/2015 | Wither et al. | |
| 8,965,696 B2 | 2/2015 | van Os et al. | |
| D726,204 S | 4/2015 | Prajapati et al. | |
| 9,020,745 B2 | 4/2015 | Johnston et al. | |
| D728,616 S | 5/2015 | Gomez et al. | |
| D730,378 S | 5/2015 | Xiong et al. | |
| D730,379 S | 5/2015 | Xiong et al. | |
| 9,036,000 B1 | 5/2015 | Ogale et al. | |
| D731,520 S | 6/2015 | Xiong et al. | |
| D731,524 S | 6/2015 | Brinda et al. | |
| D731,545 S | 6/2015 | Lim et al. | |
| D732,062 S | 6/2015 | Kwon | |
| D732,567 S | 6/2015 | Moon et al. | |
| 9,047,692 B1 | 6/2015 | Seitz et al. | |
| D733,740 S | 7/2015 | Lee et al. | |
| D733,741 S | 7/2015 | Lee et al. | |
| D734,356 S | 7/2015 | Xiong et al. | |
| D735,733 S | 8/2015 | Hontz, Jr. | |
| 9,106,872 B2 | 8/2015 | Tsurumi | |
| D738,900 S | 9/2015 | Drozd et al. | |
| D738,901 S | 9/2015 | Amin | |
| D738,914 S | 9/2015 | Torres et al. | |
| 9,158,414 B1 | 10/2015 | Gluzberg et al. | |
| 9,171,527 B2 | 10/2015 | Siegel | |
| D743,984 S | 11/2015 | Salituri | |
| 9,189,839 B1 | 11/2015 | Sheridan et al. | |
| D745,020 S | 12/2015 | Mariet et al. | |
| D745,038 S | 12/2015 | Abbas | |
| D746,313 S | 12/2015 | Walmsley et al. | |
| D746,319 S | 12/2015 | Zhang et al. | |

(56) References Cited

U.S. PATENT DOCUMENTS

| | | | |
|---|---|---|---|
| 9,215,448 B2 | 12/2015 | Barnes |
| 9,218,682 B2 | 12/2015 | Arrasvuori |
| 9,218,789 B1 | 12/2015 | Lininger et al. |
| 9,225,947 B2 | 12/2015 | Lee et al. |
| D746,856 S | 1/2016 | Jiang et al. |
| 9,244,940 B1 | 1/2016 | Donsbach et al. |
| 9,256,961 B2 | 2/2016 | Lynch |
| 9,256,983 B2 | 2/2016 | Lynch |
| D754,720 S | 4/2016 | Yang |
| 9,311,396 B2 | 4/2016 | Meadow et al. |
| 9,317,188 B2 | 4/2016 | Gregotski et al. |
| 9,325,946 B2 | 4/2016 | Tanaka et al. |
| D757,784 S | 5/2016 | Lee et al. |
| 9,330,501 B2 | 5/2016 | Sahoo et al. |
| 9,330,504 B2 | 5/2016 | Ege |
| D760,272 S | 6/2016 | Li |
| 9,363,463 B2 | 6/2016 | Taneichi et al. |
| 9,377,320 B2 | 6/2016 | Sheridan et al. |
| D762,238 S | 7/2016 | Day et al. |
| 9,390,519 B2 | 7/2016 | Lynch |
| D762,702 S | 8/2016 | Hoang et al. |
| D763,294 S | 8/2016 | Amin et al. |
| 9,411,419 B2 | 8/2016 | Kasahara et al. |
| 9,418,472 B2 | 8/2016 | Dillard et al. |
| 9,424,536 B2 | 8/2016 | Bear et al. |
| D766,263 S | 9/2016 | Rice et al. |
| D767,589 S | 9/2016 | Ye et al. |
| 9,442,956 B2 | 9/2016 | Konig et al. |
| 9,454,848 B2 | 9/2016 | Mattila |
| D768,178 S | 10/2016 | Valade et al. |
| D768,685 S | 10/2016 | Lee et al. |
| D769,279 S | 10/2016 | Woo et al. |
| D769,909 S | 10/2016 | Roberts et al. |
| D769,931 S | 10/2016 | McMillan et al. |
| 9,471,834 B1 | 10/2016 | Filip |
| 9,477,368 B1 | 10/2016 | Filip et al. |
| 9,529,803 B2 | 12/2016 | Kisielius et al. |
| 9,532,008 B2 | 12/2016 | Ohnishi |
| 9,535,587 B2 | 1/2017 | Dorfman et al. |
| 9,551,579 B1 | 1/2017 | Sheridan et al. |
| 9,554,060 B2 | 1/2017 | Filip |
| D780,210 S | 2/2017 | Kisielius et al. |
| D780,211 S | 2/2017 | Kisielius et al. |
| 9,569,498 B2 | 2/2017 | Sheridan et al. |
| D780,777 S | 3/2017 | Kisielius et al. |
| D780,794 S | 3/2017 | Kisielius et al. |
| D780,795 S | 3/2017 | Kisielius et al. |
| D780,796 S | 3/2017 | Kisielius et al. |
| D780,797 S | 3/2017 | Kisielius et al. |
| D781,317 S | 3/2017 | Kisielius et al. |
| D781,318 S | 3/2017 | Kisielius et al. |
| D781,337 S | 3/2017 | Kisielius et al. |
| 9,601,087 B2 | 3/2017 | Suzuki et al. |
| D784,395 S | 4/2017 | Laing et al. |
| 9,641,755 B2 | 5/2017 | Lynch |
| 9,791,290 B2 | 10/2017 | Kraus et al. |
| 9,805,064 B2 | 10/2017 | Kojima et al. |
| 9,813,621 B2 | 11/2017 | Anderson et al. |
| 9,841,291 B2 | 12/2017 | Sheridan et al. |
| 9,864,481 B2 | 1/2018 | Misawa |
| 9,886,794 B2 | 2/2018 | van Os et al. |
| 9,898,857 B2 | 2/2018 | Dillard et al. |
| 9,924,156 B2 | 3/2018 | Barnes |
| 9,934,222 B2 | 4/2018 | Leong et al. |
| 9,972,121 B2 | 5/2018 | Li et al. |
| 10,030,990 B2 | 7/2018 | Lynch |
| D829,737 S | 10/2018 | Kisielius et al. |
| D830,399 S | 10/2018 | Kisielius et al. |
| D830,407 S | 10/2018 | Kisielius et al. |
| 10,094,675 B2 | 10/2018 | Hajj et al. |
| 10,127,722 B2 | 11/2018 | Shakib et al. |
| 10,139,985 B2 | 11/2018 | Mildrew et al. |
| D835,147 S | 12/2018 | Kisielius et al. |
| 10,163,263 B2 | 12/2018 | Zhu et al. |
| 10,176,633 B2 | 1/2019 | Moore et al. |
| 10,247,568 B2 | 4/2019 | Fillhardt et al. |
| 2001/0014185 A1 | 8/2001 | Chitradon et al. |
| 2001/0017668 A1 | 8/2001 | Wilcock et al. |
| 2002/0047895 A1 | 4/2002 | Bernardo et al. |
| 2002/0075322 A1 | 6/2002 | Rosenzweig et al. |
| 2002/0122073 A1 | 9/2002 | Abrams et al. |
| 2002/0171668 A1 | 11/2002 | Samra |
| 2003/0025803 A1 | 2/2003 | Nakamura et al. |
| 2003/0030636 A1 | 2/2003 | Yamaoka |
| 2003/0117611 A1 | 6/2003 | Chon et al. |
| 2003/0142523 A1 | 7/2003 | Biacs |
| 2004/0001109 A1 | 1/2004 | Blancett et al. |
| 2004/0125133 A1 | 7/2004 | Pea et al. |
| 2004/0125148 A1 | 7/2004 | Pea et al. |
| 2004/0196282 A1 | 10/2004 | Oh |
| 2004/0264919 A1 | 12/2004 | Taylor et al. |
| 2005/0063608 A1 | 3/2005 | Clarke et al. |
| 2005/0216186 A1 | 9/2005 | Dorfman et al. |
| 2005/0232606 A1 | 10/2005 | Hosoda et al. |
| 2006/0041591 A1 | 2/2006 | Rhoads |
| 2006/0120624 A1 | 6/2006 | Jojic et al. |
| 2006/0181546 A1 | 8/2006 | Jung et al. |
| 2006/0203335 A1 | 9/2006 | Martin et al. |
| 2006/0208926 A1 | 9/2006 | Poor et al. |
| 2006/0238379 A1 | 10/2006 | Kimchi et al. |
| 2006/0251338 A1 | 11/2006 | Gokturk et al. |
| 2006/0266942 A1 | 11/2006 | Ikeda |
| 2006/0271287 A1 | 11/2006 | Gold et al. |
| 2007/0024722 A1 | 2/2007 | Eura et al. |
| 2007/0081081 A1 | 4/2007 | Cheng |
| 2007/0096945 A1 | 5/2007 | Rasmussen et al. |
| 2007/0103461 A1 | 5/2007 | Suzuno et al. |
| 2007/0110338 A1* | 5/2007 | Snavely .............. G06K 9/32 382/305 |
| 2007/0113255 A1 | 5/2007 | Kurosawa |
| 2007/0136259 A1 | 6/2007 | Dorfman et al. |
| 2007/0150188 A1 | 6/2007 | Rosenberg |
| 2007/0216709 A1 | 9/2007 | Kojima et al. |
| 2007/0250477 A1 | 10/2007 | Bailly |
| 2007/0279438 A1 | 12/2007 | Takakura et al. |
| 2008/0002962 A1 | 1/2008 | Ito et al. |
| 2008/0016472 A1 | 1/2008 | Rohlf et al. |
| 2008/0043020 A1 | 2/2008 | Snow et al. |
| 2008/0060004 A1 | 3/2008 | Nelson et al. |
| 2008/0066000 A1* | 3/2008 | Ofek .............. G06F 16/29 715/757 |
| 2008/0077597 A1 | 3/2008 | Butler |
| 2008/0089593 A1 | 4/2008 | Ohwa |
| 2008/0091635 A1 | 4/2008 | James et al. |
| 2008/0158366 A1 | 7/2008 | Jung et al. |
| 2008/0174593 A1 | 7/2008 | Ham et al. |
| 2008/0187181 A1 | 8/2008 | Meadow et al. |
| 2008/0266142 A1 | 10/2008 | Sula et al. |
| 2008/0285886 A1 | 11/2008 | Allen |
| 2008/0291201 A1 | 11/2008 | Lafon |
| 2008/0291217 A1* | 11/2008 | Vincent .............. G06T 19/00 345/629 |
| 2008/0292213 A1 | 11/2008 | Chau |
| 2009/0046057 A1 | 2/2009 | Umezawa |
| 2009/0063424 A1 | 3/2009 | Iwamura et al. |
| 2009/0064014 A1 | 3/2009 | Nelson et al. |
| 2009/0135178 A1 | 5/2009 | Aihara et al. |
| 2009/0179895 A1 | 7/2009 | Zhu et al. |
| 2009/0202102 A1 | 8/2009 | Miranda et al. |
| 2009/0210793 A1* | 8/2009 | Yee .............. G06F 16/58 715/723 |
| 2009/0213112 A1 | 8/2009 | Zhu et al. |
| 2009/0240431 A1 | 9/2009 | Chau et al. |
| 2009/0279794 A1 | 11/2009 | Brucher et al. |
| 2009/0284551 A1 | 11/2009 | Stanton |
| 2009/0290812 A1 | 11/2009 | Naaman et al. |
| 2009/0303251 A1 | 12/2009 | Balogh et al. |
| 2010/0064239 A1 | 3/2010 | Crawford et al. |
| 2010/0115455 A1 | 5/2010 | Kim |
| 2010/0122208 A1 | 5/2010 | Herr et al. |
| 2010/0149212 A1 | 6/2010 | Fukuya et al. |
| 2010/0184451 A1 | 7/2010 | Wang et al. |
| 2010/0188503 A1 | 7/2010 | Tsai et al. |
| 2010/0215250 A1 | 8/2010 | Zhu |

(56) References Cited

U.S. PATENT DOCUMENTS

| | | |
|---|---|---|
| 2010/0215254 A1 | 8/2010 | Prokhorov |
| 2010/0250581 A1 | 9/2010 | Chau |
| 2010/0259641 A1 | 10/2010 | Fujimoto |
| 2010/0309512 A1 | 12/2010 | Onoda |
| 2010/0316357 A1 | 12/2010 | Saitou et al. |
| 2010/0325589 A1 | 12/2010 | Ofek et al. |
| 2011/0007094 A1 | 1/2011 | Nash et al. |
| 2011/0007130 A1 | 1/2011 | Park et al. |
| 2011/0007134 A1 | 1/2011 | Knize et al. |
| 2011/0010668 A1 | 1/2011 | Feldstein et al. |
| 2011/0016398 A1 | 1/2011 | Hanes |
| 2011/0050706 A1 | 3/2011 | Cherna et al. |
| 2011/0055749 A1 | 3/2011 | Wallace et al. |
| 2011/0074707 A1 | 3/2011 | Watanabe et al. |
| 2011/0074811 A1 | 3/2011 | Hanson et al. |
| 2011/0085778 A1 | 4/2011 | Iwase et al. |
| 2011/0123120 A1 | 5/2011 | Quack |
| 2011/0173565 A1 | 7/2011 | Ofek et al. |
| 2011/0211040 A1 | 9/2011 | Lindemann et al. |
| 2011/0211764 A1 | 9/2011 | Krupka et al. |
| 2011/0234832 A1 | 9/2011 | Ezoe et al. |
| 2011/0249166 A1 | 10/2011 | Moriyama |
| 2011/0254976 A1 | 10/2011 | Garten |
| 2011/0292076 A1* | 12/2011 | Wither ............... G06F 16/9537 345/632 |
| 2011/0302527 A1 | 12/2011 | Chen et al. |
| 2011/0316884 A1* | 12/2011 | Giambalvo .......... G06F 16/44 345/660 |
| 2012/0011464 A1 | 1/2012 | Hayashi et al. |
| 2012/0033032 A1 | 2/2012 | Kankainen |
| 2012/0062695 A1 | 3/2012 | Sakaki |
| 2012/0075410 A1 | 3/2012 | Matsumoto et al. |
| 2012/0092447 A1 | 4/2012 | Jeong et al. |
| 2012/0098854 A1 | 4/2012 | Ohnishi |
| 2012/0127066 A1 | 5/2012 | Iida et al. |
| 2012/0169769 A1 | 7/2012 | Minamino et al. |
| 2012/0188247 A1 | 7/2012 | Cheung et al. |
| 2012/0191339 A1 | 7/2012 | Lee et al. |
| 2012/0194547 A1 | 8/2012 | Johnson et al. |
| 2012/0242783 A1 | 9/2012 | Seo et al. |
| 2012/0274625 A1 | 11/2012 | Lynch |
| 2012/0281119 A1 | 11/2012 | Ohba et al. |
| 2012/0293607 A1 | 11/2012 | Bhogal et al. |
| 2012/0299920 A1 | 11/2012 | Coombe et al. |
| 2012/0300019 A1 | 11/2012 | Yang et al. |
| 2012/0301039 A1 | 11/2012 | Maunder et al. |
| 2012/0316782 A1 | 12/2012 | Sartipi et al. |
| 2013/0035853 A1 | 2/2013 | Stout et al. |
| 2013/0044108 A1 | 2/2013 | Tanaka et al. |
| 2013/0076784 A1 | 3/2013 | Maurer et al. |
| 2013/0100114 A1 | 4/2013 | Lynch |
| 2013/0103303 A1 | 4/2013 | Lynch |
| 2013/0106990 A1 | 5/2013 | Williams et al. |
| 2013/0162665 A1 | 6/2013 | Lynch |
| 2013/0169668 A1 | 7/2013 | Lynch |
| 2013/0169685 A1 | 7/2013 | Lynch |
| 2013/0182108 A1 | 7/2013 | Meadow et al. |
| 2013/0201216 A1 | 8/2013 | Nakamura et al. |
| 2013/0232168 A1 | 9/2013 | McGregor et al. |
| 2013/0239057 A1 | 9/2013 | Ubillos et al. |
| 2013/0294650 A1 | 11/2013 | Fukumiya et al. |
| 2013/0321461 A1 | 12/2013 | Filip |
| 2013/0332890 A1 | 12/2013 | Ramic et al. |
| 2014/0002439 A1 | 1/2014 | Lynch |
| 2014/0002440 A1 | 1/2014 | Lynch |
| 2014/0016193 A1 | 1/2014 | Terashima et al. |
| 2014/0019301 A1 | 1/2014 | Meadow et al. |
| 2014/0019302 A1 | 1/2014 | Meadow et al. |
| 2014/0023355 A1 | 1/2014 | Terashima |
| 2014/0078177 A1 | 3/2014 | Yamaji et al. |
| 2014/0078263 A1 | 3/2014 | Kim |
| 2014/0079322 A1 | 3/2014 | Yamaji et al. |
| 2014/0118405 A1* | 5/2014 | Chand ............... G06F 16/9537 345/661 |
| 2014/0164988 A1 | 6/2014 | Barnett et al. |
| 2014/0181259 A1 | 6/2014 | You |
| 2014/0210940 A1 | 7/2014 | Barnes |
| 2014/0240455 A1 | 8/2014 | Subbian et al. |
| 2014/0253542 A1 | 9/2014 | Jung et al. |
| 2014/0297575 A1 | 10/2014 | Rapoport et al. |
| 2014/0362108 A1 | 12/2014 | Aguera-Arcas |
| 2014/0376823 A1 | 12/2014 | Cui et al. |
| 2015/0077521 A1 | 3/2015 | Borchert et al. |
| 2015/0085068 A1 | 3/2015 | Becker et al. |
| 2015/0109328 A1 | 4/2015 | Gallup et al. |
| 2015/0109513 A1 | 4/2015 | Nayar et al. |
| 2015/0113474 A1 | 4/2015 | Gallup et al. |
| 2015/0130848 A1 | 5/2015 | Sakaniwa et al. |
| 2015/0145995 A1 | 5/2015 | Shahraray et al. |
| 2015/0154736 A1 | 6/2015 | Seitz et al. |
| 2015/0161807 A1 | 6/2015 | Pack |
| 2015/0170615 A1 | 6/2015 | Siegel |
| 2015/0185018 A1 | 7/2015 | Hesch et al. |
| 2015/0185873 A1 | 7/2015 | Ofstad et al. |
| 2015/0185991 A1 | 7/2015 | Ho et al. |
| 2015/0235398 A1 | 8/2015 | Kim et al. |
| 2015/0248197 A1 | 9/2015 | Peters et al. |
| 2015/0254694 A1 | 9/2015 | Filip |
| 2015/0262391 A1 | 9/2015 | Chau |
| 2015/0278878 A1 | 10/2015 | Chau |
| 2015/0294153 A1 | 10/2015 | Naithani et al. |
| 2015/0301695 A1 | 10/2015 | Leong et al. |
| 2015/0302633 A1 | 10/2015 | Li et al. |
| 2015/0304588 A1 | 10/2015 | Jung et al. |
| 2015/0310596 A1 | 10/2015 | Sheridan et al. |
| 2015/0371389 A1 | 12/2015 | Siegel et al. |
| 2016/0005437 A1 | 1/2016 | Barry et al. |
| 2016/0014190 A1 | 1/2016 | Sheory |
| 2016/0019223 A1 | 1/2016 | Kisielius et al. |
| 2016/0019713 A1 | 1/2016 | Dillard et al. |
| 2016/0027177 A1 | 1/2016 | Hutchison |
| 2016/0042252 A1 | 2/2016 | Sawhney et al. |
| 2016/0048934 A1 | 2/2016 | Gross |
| 2016/0063516 A1 | 3/2016 | Terrazas et al. |
| 2016/0063705 A1 | 3/2016 | Xu et al. |
| 2016/0081620 A1 | 3/2016 | Narayanan et al. |
| 2016/0098612 A1 | 4/2016 | Viviani |
| 2016/0140744 A1 | 5/2016 | Strelow et al. |
| 2016/0156840 A1 | 6/2016 | Arai et al. |
| 2016/0179760 A1 | 6/2016 | Strong et al. |
| 2016/0209648 A1 | 7/2016 | Haddick et al. |
| 2016/0231134 A1 | 8/2016 | Nguyen Kim et al. |
| 2016/0321783 A1 | 11/2016 | Citrin et al. |
| 2016/0349066 A1 | 12/2016 | Chung et al. |
| 2016/0379094 A1 | 12/2016 | Mittal et al. |
| 2017/0109612 A1 | 4/2017 | Mittal et al. |
| 2017/0116477 A1 | 4/2017 | Chen et al. |
| 2017/0132224 A1 | 5/2017 | Yang |
| 2017/0142766 A1 | 5/2017 | Kim |
| 2017/0178404 A1 | 6/2017 | Dillard et al. |
| 2017/0256040 A1 | 9/2017 | Grauer |
| 2017/0287221 A1 | 10/2017 | Ghaly et al. |
| 2017/0300511 A1 | 10/2017 | Brewington et al. |
| 2017/0308752 A1 | 10/2017 | Takeuchi et al. |
| 2017/0356755 A1 | 12/2017 | Strawn et al. |
| 2018/0018754 A1 | 1/2018 | Leng et al. |
| 2018/0035074 A1 | 2/2018 | Barnes, Jr. |
| 2018/0053293 A1 | 2/2018 | Ramalingam et al. |
| 2018/0061126 A1 | 3/2018 | Huang et al. |
| 2018/0143023 A1 | 5/2018 | Bjorke et al. |
| 2018/0143756 A1 | 5/2018 | Mildrew et al. |
| 2018/0350126 A1 | 12/2018 | Oh |
| 2019/0005719 A1 | 1/2019 | Fleischman et al. |
| 2019/0026793 A1 | 1/2019 | Rollon |
| 2019/0043259 A1 | 2/2019 | Wang et al. |
| 2019/0051029 A1 | 2/2019 | Schpok |
| 2019/0087067 A1 | 3/2019 | Hoyden et al. |

OTHER PUBLICATIONS

Luttermann et al., "VRML History: Storing and Browsing Temporal 3D-Worlds", VRML '99, pp. 153-181, 1999. (Year: 1999).*

(56) References Cited

OTHER PUBLICATIONS

Snavely et al., "Photo Tourism: Exploring Photo Collections in 3D", ACM Transactions on Graphics, v. 25, n. 3, pp. 835-846, Jul. 2006. (Year: 2006).*
Examination Report issued in European Patent Application 15771739.8, dated Jan. 23, 2019, 5 pages.
Rejection Decision for Chinese Patent Application No. 201580020984.2 dated May 28, 2019.
Second Office Action dated Jan. 8, 2019, for Chinese Patent Application No. 201580020984.2.
Wu, et al, "Automatic Alignment of Large-scale Aerial Rasters to Road-maps" Proceedings of the 15th international Symposium on Advances in Geographic information Systems, 2007.
Barclay, et al., "Microsoft TerraServer: A Spatial Data Warehouse", 2005.
Bauman, "Raster Databases", 2007.
Ghemawat, et al. "The Google File System", 2003.
U.S. Appl. No. 11/415,960, Zelirilca et al., "Coverage Mask Generation for Large Images", filed May 2, 2006.
U.S. Appl. No. 11/437,553, "Large-Scale Image Processing Using Mass Parallelizallon Techniques", filed May 19, 2006.
U.S. Appl. No. 11/473,461, Kirmse et al, "Hierarchical Spatial Data Structure and 3D Index Data Verseoning for Generating Packet Data", filed Jun. 22, 2006.
Scranton et al., "Sky in Google Earth: The Next Frontier in Astronomical Data Discovery and Visualization", http://earth.google.com/sky/, Sep. 10, 2007.
International Search Report, PCT/US09/04817, dated Oct. 8, 2009. http://ieeexplore.ieee.org/search retrieved from the Internet on Sep. 7, 2010.
Potmesil M., "Maps alive: Viewing geospacial information on the WWW", Computer Systems and ISDN Systems, North Holland Publishing, Amsterdam, NL, vol. 29, No. 8-13, Sep. 1, 1997 (Sep. 1, 1997), pp. 1327-1342, XP004095328.
Nan L. et al., "A spatial-temporal system for dynamic cadastral management," Journal of Environmental Management, Academic Press, London, GB, vol. 78, No. 4, Mar. 1, 2006 (Mar. 1, 2006), pp. 373-381, retrieved on Mar. 1, 2006.
Rocchini D. et al., "Landscape change and the dynamics of open formations in a natural reserve," Landscape and urban Planning, Elsevier, vol. 77, No. 1-2, Jun. 15, 2006 (Jun. 15, 2006), pp. 167-177, retrieved on Jun. 15, 2006.
The extended European search report, Application No. EP 09 81 0353.4, PCT/US2009004817, dated Dec. 5, 2011.
Gail Langran, Nicholas R. Chrisman: "A Framework for temporal Geographic Information", University of Washington Cartographica, vol. 25, No. 3, Dec. 31, 1988 (Dec. 31, 1988 ), pp. 1-14, Retrieved from the Internet: URL:http://www.unigis.ac.at/fernstudien/unigis_professional/lehrgangs_cd_1..../module//modul2/Temporal%20Geographic%20Information.pdf.
European Examination Report for Application No. 09810353.4 dated Oct. 18, 2012.
Vlahakis et al., "Archeoguide: An Augmented Reality Guide for Archaeological Sites", IEEE Computer Graphics and Applications, Sep./Oct. 2002, pp. 52-60.
Haval, "Three-Dimensional Documentation of Complex Heritage Structures", Interpretive Enviornments, Apr.-Jun. 2000, pp. 52-55.

Magnenat-Thalmann et al., "Real-Time Animation of Ancient Roman Sites", 2006, pp. 19-30.
Conti et al., "DentroTrento—A virtual Walk Across history", 2006, pp. 318-321.
European Office Action for Application No. 09810353 dated Oct. 9, 2013.
U.S. Appl. No. 13/854,314, filed Apr. 1, 2013.
U.S. Appl. No. 13/870,419, filed Apr. 25, 2013.
Bhagavathy et al., "Modeling and Detection of Geospatial Objects Using Texture Motifs" 3706 IEEE Transactions on Geoscience and Remote Sensing. vol. 44, No. 12, Dec. 2006.
Blackcoffee Design, 1000 Icons Symbols and Pictograms: Visual Communication for Every Language, Gloucester, MA: Rockport Publishers, 2006, 29, 49, 65, 101.
Iconfinder, "Expand Icons", [unknown date], Iconfinder [online], [site visited Oct. 19, 2015]. Available from internet: <URL:https://www.iconfinder.com/search/?q=expand>.
Frutiger, Adrian, Signs and Symbols: their design and meaning, New York: Watson-Guptill Publications, 1998, 337, 350.
Dreyfuss, Henry, Symbol Sourcebook, New York: Van Nostrand Reinhold Co., 1972, 28.
Taylor, Frank, New Google Maps Moon Update, Sep. 13, 2007, Google Earth Blog [online], [site visited Oct. 15, 2015]. Available from Internet: <URL: https://www.gearthblog.com/blog/archives/2007/09/new_goolge_maps_moon_update.html>.
Abair, Randy, Google Maps Changes, Sep. 2013 Online Marketing Year in Review, Jan. 2, 2014, Vermont DesignWorks Blog [online], [site visited Oct. 15, 2015]. Available from Internet: <URL: http://www.vtdesignworks.com/blog/seo-2013>.
GordyHanner, Why can't I watch Videos in full screen on Youtube?, Dec. 6, 2010, Youtube [online], [site visited Oct. 15, 2015]. Available from Internet: <URL:https://www.youtube.com/watch?v=8n7nn-3CI2A>.
Clohessy, James W. and Patrick J Cerra, How do you warn 19 million people at the drop of a hat?, ArcNews, Fall 2011, [online], [site visited Oct. 15, 2015]. Available from Internet: <URL:https://www.esri.com/news/arcnews/fall11articles/how-do-you-warn-19-million-people-at-the-drop-of-a-hat.html>.
Icons, Google Design Library, updated, Google Inc. [online], [site visited Oct. 19, 2015]. Available from Internet: <https://www.google.com/design/icons/>.
Thompson, Helen, With Google Maps, Apr. 23, 2014, Smithsonianmag.com [online], [site visited Jul. 19, 2016]. Available from Internet: <http://www.smithsonianmag.com/innovation/google-maps-unveils-time-travel-function-street-view-180951184/?no-ist>.
International Preliminary Report on Patentability for PCT Application No. PCT/US2015/025551, dated Nov. 3, 2016.
Wikipedia, Google Street View, Sep. 3, 2014, wikipedia.com [online], [site visited Nov. 4, 2016]. Available from Internet: <https ://en.wikipedia.org/wiki/Google Street_ View>.
Wikipedia, Google Maps Street View redesign, Jun. 10, 2014, wikipedia.com [online], [site visited Nov. 7, 2016]. Available from Internet: <https://en.wikipedia.org/wiki/Google_Maps>.
Snavely et al., "Photo Tourism: Exploring Photo Collections in 3D", 2006, Particularly see: FIGS. 1 (c), 5, Section 5.1, 12 pages.
First Office Action dated Mar. 20, 2018, for Chinese Patent Application No. 201580020984.2.
Examination Report for European Patent Application No. 15771739.8, dated May 8, 2018. 10 pages.

\* cited by examiner

PROVIDING A THUMBNAIL IMAGE THAT FOLLOWS A MAIN IMAGE

CROSS-REFERENCE TO RELATED APPLICATIONS

The present application is a continuation of U.S. patent application Ser. No. 14/258,709, filed Apr. 22, 2014, the entire disclosure of which is incorporated herein by reference.

Various systems provide users with images of different locations, including panoramic images. For example, a panoramic image may include an image or collection of images having a field of view which is greater than that of the human eye, e.g., 180 degrees or greater. Some panoramic images may provide a 360-degree view of a location.

Some systems allow users to view images in sequences, such as in time or space. In some examples, these systems can provide a navigation experience in a remote or interesting location. Some systems allow users to feel as if they are rotating within a virtual world by clicking toward the edges of a displayed portion of a panorama and having the panorama appear to "rotate" in the direction of the clicked edge, or clicking and dragging on the displayed portion of the panorama and having it appear to "rotate" following the mouse cursor.

SUMMARY

Aspects of the disclosure provide a computer implemented method for selecting time-distributed panoramas for display. The method may include one or more computing devices receiving a request for a first image at a first location, wherein the first image will be displayed at a first orientation and the first image has associated with a first time, and wherein each of the one or more computing devices includes one or more processors. The method may further include determining at least one other image based at least in part on the first location, wherein each of the at least one other images are associated with a different time than the first time. The method may also include providing for display the first image and an indication that the at least one other images associated with different time are available. A request may be received for a second image associated with a second time, wherein the second image is one of the at least one other images, and wherein the second time is different from the first time. In response to the received request, the second image may be provided for display concurrently with the first image, wherein the second image is associated with the second time. In another example, the second image is provided for display so that the orientation of the second image corresponds to the orientation of the first image.

The method may further include receiving input indicating a change to a second orientation of the first image, and automatically providing for display a transition in the second image so as to correspond to the second orientation of the first image. In another example, the method may include receiving a request for a third image associated with a third time, wherein the third image is one of the at least one other images, and wherein the third time is different from the second time. In response to the received request for a third image, the second image may be replaced with the third image, wherein the third image is provided for display so that it corresponds to the first location and the first orientation of the first image.

In yet another aspect, the method may include providing for display a timeline having a visual indicia of a given time period being displayed. In addition, receiving the request for the third image may include a user moving the visual indicia along the timeline from a first position associated with the second time to a second position associated with the third time. In accordance with one aspect, replacing the second image with the third image may include the second image fading out and the third image fading in as the user moves the visual indicia along the timeline. The method may also include determining that one or more intermediate images are associated with the location of the first image, wherein these intermediate images were captured at an intermediate time period between the second time and the third time. Replacing the second image with the third image may further include replacing the second image with one or more intermediate images and replacing the one or more intermediate images with the third image.

In still another aspect, the method may include providing for display concurrently with the first image one or more supplementary images that relate to the first image. In response to receiving the request for the second image, replacing one or more of the supplementary images with corresponding supplementary images that correspond to the second time.

In another aspect, the method may include providing for display a plurality of supplementary images concurrently with the first image, wherein the supplementary images are selected from the at least one other images, wherein the supplementary images are associated with different time periods, and wherein each supplementary image has an orientation that corresponds to the orientation of the first image.

In still another aspect, the disclosure provides for a non-transitory computer-readable storage medium on which computer readable instructions of a program are stored, the instructions, when executed by one or more processors, cause the one or more processors to perform the methods described above.

DETAILED DESCRIPTION

Overview

Figure 1:
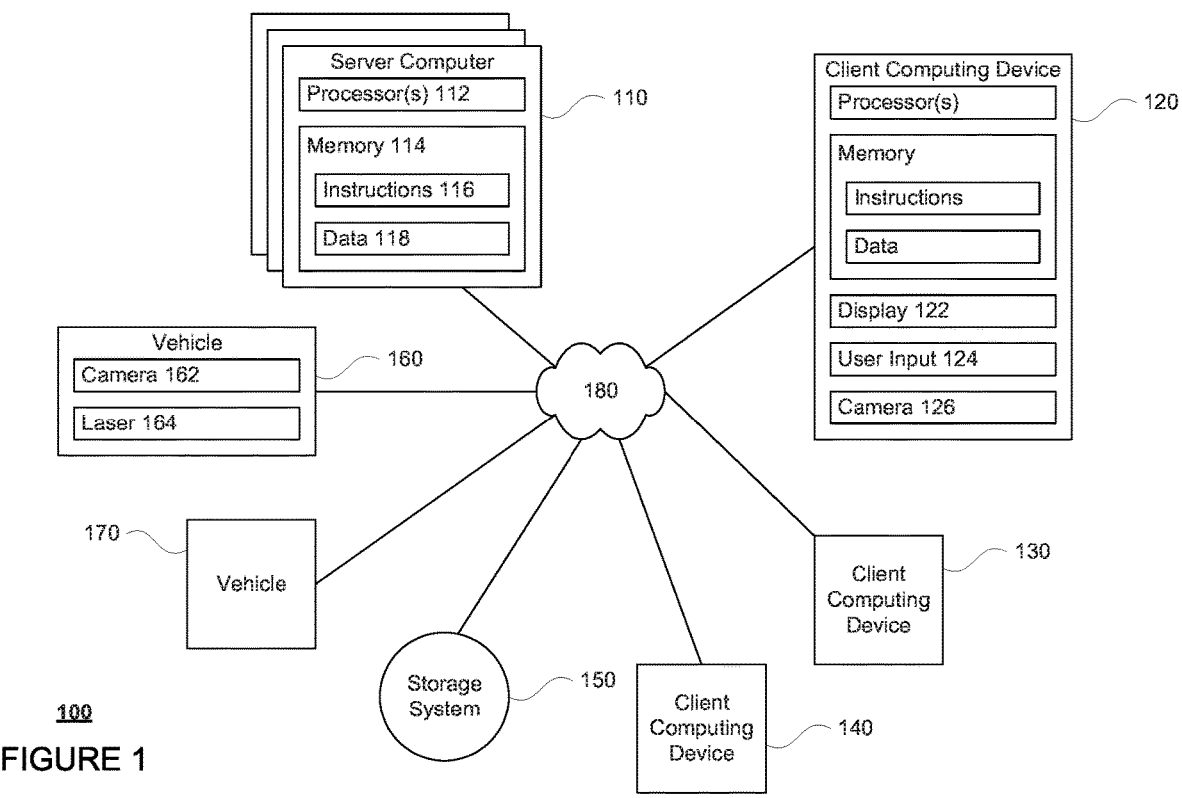
FIG. 1 is an example of a system that may be used in accordance with aspects of the disclosure.

The technology relates to selecting and displaying images captured at different points in time. As an example, a user of a computing device may view a street level panoramic image as viewed from a particular location and oriented in a particular direction. This image may be displayed in a main viewing area. In addition to this main image, the system may also provide another view of the same location, as it appeared at a different point in time. In one aspect, the computing device may display a thumbnail image that was captured at a date other than the date of image being displayed in the main viewing area. In addition, the thumbnail image may be displayed so that it corresponds to the location and orientation of the panoramic image that is displayed in the main viewing area. As an example, a user may be viewing a popular restaurant and wonder what was at that location before the restaurant. Similarly, the user may wish to see what a particular location looked like during a certain time of year.

In one aspect, the computing device may display an icon indicating that additional street level images from other points in time are available. For example, a clock icon may be displayed in connection with the main image when imagery from another time period is available. Upon the user selecting the clock icon, the computing device may display the thumbnail image that corresponds to the street level image being displayed in the main viewing area.

Corresponding thumbnail images may be selected from among a plurality of panoramic images to identify an image that was captured at a different point in time than the main image but that has a capture location that is closest to the capture location of the main image. Here, the different point in time may refer to two different collection dates or passes near the location of the given panoramic image.

In one example, the user may select the time period of the images to be displayed within the thumbnail viewing area by choosing a particular point along a displayed timeline. The timeline may include all time periods for which corresponding street level images are available, or the user may select a particular range of time periods to be displayed within the timeline. In one aspect, the timeline may contain a plurality of markers indicating points in time for which additional street level images are available.

The user may also transition between thumbnail images from different points in time. For example, the user may slide a cursor along the displayed timeline from a first point in time to a second point in time. In one example, the transition of the thumbnail image may occur by fading out the image that corresponds to the first point in time and fading in the thumbnail image that corresponds to the second point in time as the cursor moves between the two time periods. In another example, the computing device may display, in chronological order, some or all of the intermediate images that were taken between two points in time.

In one aspect of the disclosure, the orientation of the thumbnail image may always correspond to that of the main image that is displayed in the main viewing area. Accordingly, if the user causes the main image to pan by 20 degrees to the left, then the thumbnail image may also automatically pan 20 degrees to the left—or the panorama in the thumbnail may change so that the same area centered in the main view is pictured in the thumbnail. Other changes in the main viewing area may also automatically occur in the thumbnail image. For example, a change in the level of zoom or the location from which the main image is being viewed may cause a corresponding change in the thumbnail image. Similarly, a change in the thumbnail image may also cause a corresponding change in the main image.

The computing device may also display a plurality of supplementary thumbnail images that are related to the main image in some way, such as being within a predetermined distance from the main image. In one aspect, the supplementary images may correspond to the point in time that has been selected by the user. Accordingly, as the user selects a particular time period within the timeline, each of the supplementary images may be updated so as to correspond to the selected time period.

Example Systems

Figure 2:
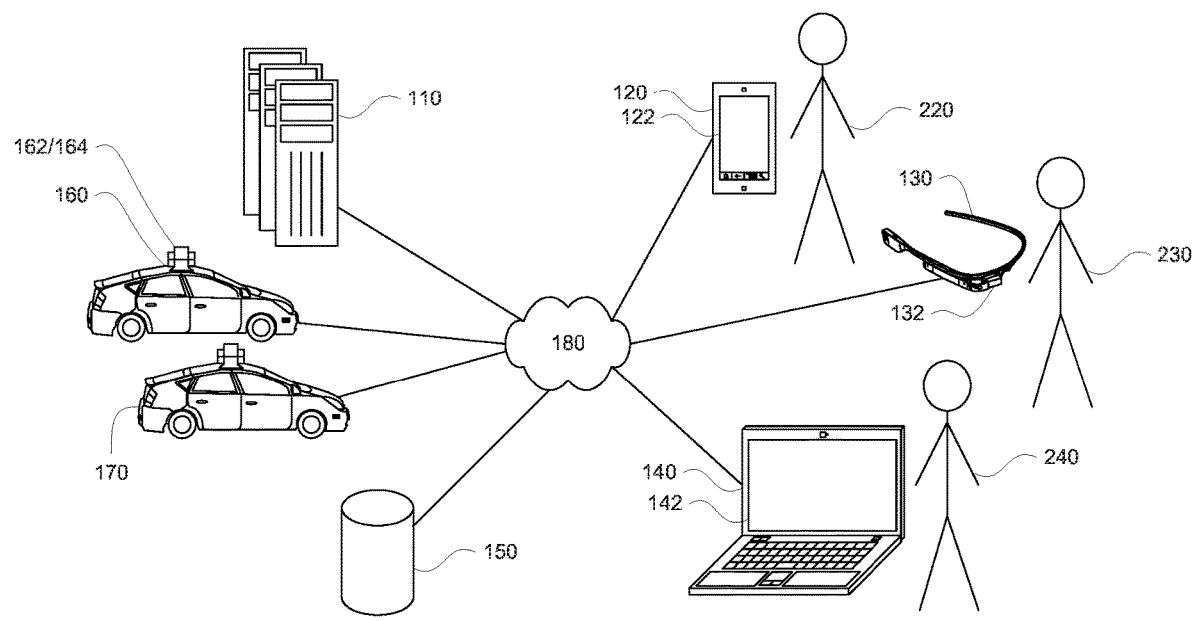
FIG. 2 is a diagram of various devices that may be used in connection with the example system.

FIGS. 1 and 2 include an example system 100 in which the features described herein may be implemented. It should not be considered as limiting the scope of the disclosure or usefulness of the features described herein. In this example, system 100 can include one or more computing devices 110, 120, 130, and 140, storage system 150, as well as collection devices 160 and 170. One or more computing devices 110 can contain one or more processors 112, memory 114 and other components typically present in general purpose computing devices. Memory 114 of the one or more computing devices 110 can store information accessible by one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as one or more commercially available CPUs and/or GPUs. Alternatively, the processor can be a dedicated component such as an ASIC or other hardware-based processor. Although not necessary, one or more computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in one or more housings different from those of the one or more computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 180.

The one or more computing devices 110 can be at various nodes of a network 180 and capable of directly and indirectly communicating with other nodes of network 180. Although only a few computing devices are depicted in FIGS. 1-2, it should be appreciated that a typical system can include a large number of connected computing devices, with each different computing device (as well as collection device) being at a different node of the network 180. The network 180 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, the one or more computing devices 110 may include one or more web servers that are capable of communicating with storage system 150 as well as computing devices 120, 130, and 140 via the network. For example, one or more server computing devices 110 may use network 180 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 250, 250, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touchscreen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 may store various types of information. As described in more detail below, the storage system 150 may store images, such as those described above as having a field of view which is greater than that of the human eye, e.g., 180 degrees or greater. In that regard, example panoramic images described herein provide a 360-degree view of a location, though other types of images may also be used. In addition, each panoramic image may be associated with geographic location information indicating the location and, in some cases, the orientation at which the panoramic image was captured (e.g., which part of the panoramic image is oriented towards "North", etc.) as well as timestamp information indicating the date and time at which the panoramic image was captured.

The storage system 150 may also store 3D geometry data. As explained above and described in more detail below, this 3D geometry data may correspond to points on the surface of any objects in the plurality of panoramic image. The 3D geometry data may provide the position (x,y,z) of points relative to a particular coordinate system (e.g. relative to a position of a LIDAR system that generated the geometry data or a global positioning system (GPS) such as latitude, longitude, and altitude coordinates).

Storage system 150 may also store map information. The map information may be an image based map or may include a plurality of vectors used to identify the shape, orientation, and other characteristics of streets used to display a map. In this regard, the streets may be divided into discrete road segments. As an example, collection of such road segments (or vectors) may be used to display a map.

As with memory 114, storage system 150 can be of any type of computerized storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 180 as shown in FIG. 1 and/or may be directly connected to or incorporated into any of the computing devices 110-140 (not shown).

Collection devices 160 and 170 may include a computing device, configured similarly to one of the server computing devices or client computing devices with a processor and memory storing data and instructions (not shown in FIG. 1 for simplicity). Collection devise 160 and 170 may also provide all or some of the images of storage system 150. Each of the collection devices 160 and 170 may include a camera or other information collection device. For example, collection device 160 may include a camera 162 mounted on a vehicle. As the vehicle is driven along a street, the camera of collection device 160 may capture panoramic images. In this regard, all or some of the panoramic images of storage system 150 may be considered "street level images." As another example, collection device 170 may include a camera rig attached to a backpack (e.g., for paths and other non-street areas), a smartphone camera, a dedicated camera device, etc. which a person walks, bikes, or otherwise moves around with in order to capture panoramic images. In addition to capturing images, the collection devices and/or camera may be configured to provide each panoramic image with a timestamp indicating the date and time at which the image was captured. The captured panoramic images and timestamps may be uploaded or downloaded to the storage system 150.

Each of collection devices 160 or 170 may include a position system 164 in order to determine the camera's relative or absolute position on a map or on the Earth when an image is captured. For example, the position system 164 may include a GPS receiver to determine the device's latitude, longitude and/or altitude position and provide a two or three dimensional (2D or 3D) location at which each panoramic image was captured by the collection device. Other location systems such as laser-based localization systems, inertial-aided GPS, trilateration/triangulation, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than an absolute geographical location.

The positioning system 164 may also include other devices in communication with the camera or collection device, such as an accelerometer, gyroscope or another direction/speed detection device to determine the orientation of the camera 162 when the panoramic image was captured. By way of example only, an acceleration device may determine its pitch, yaw or roll (or changes thereto) relative to the direction of gravity or a plane perpendicular thereto. The device may also track increases or decreases in speed and the direction of such changes.

The collection device's provision of location and orientation data as set forth herein may be associated with the panoramic images as they are being captured and provided automatically to the storage system 150, other computing devices and combinations of the foregoing. Although camera 162 and position system 164 are depicted within the collection device 160, these components may or may not be included in the same physical housing. In this regard, the position system 164 may be a different device from the camera 162 such that both components output the 2D or 3D location information and orientation information and panoramic images to the collection device which processes these outputs in order to associate them with one another and provide them to the storage system 150.

In some examples, the collection device 160 may include a LIDAR system for generating the 3D geometry data described above. For example, as a vehicle is driven along the street, a LIDAR system may be used to collect laser data or light intensity information which is converted into three dimensional points, which can then be used to determine point clouds and/or the surfaces of objects. These objects will correspond to objects that are included in a panoramic image that was captured by a camera, such as camera 162, at approximately the same geographic location as the laser data.

Example Methods

In order to provide a user with images, a first plurality of images, including panoramic images, may be captured and stored. These images may be captured by one or more cameras, including cameras mounted on a vehicle (or other device). If the camera is mounted on a vehicle, images may be captured in a sequence as the camera is moved along. Each image may be associated with 2D or 3D location and orientation information corresponding to the geographic location where the panoramic image was captured as well as a timestamp indicating the date and time when the image was captured. For example, as a collection device such as collection device 160 is moved around, such as by driving a vehicle along a street, camera 162 may capture panoramic images. At the same time, the position system 164 may provide GPS coordinates for each panoramic image captured by camera 162. Each time the collection device 160 captures a series of images may be considered a separate "run."

The location at which a particular image was captured, which may be referred to as the "snap location," may be determined by associating the GPS coordinates of the capture device at the time each image was taken. In turn, the snap location may be used by the one or more server computing devices to select one or more panoramic images that were captured at approximately the same location but at different points in time. Here, a different point in time, refers to images that were captured on different days. In this regard, given a snap location of a first panoramic image, other panoramic images of the storage system 150 may be accessed by the one or more server computing devices 110 in order to identify a second panoramic image having a snap location that is both closest to the snap location of the first panoramic image and has a timestamp which indicates that the second image was captured on a different day than the first panoramic image. In some instances if the closest panoramic image for a different day is greater than a specified distance, for example, 15 meters or more, than no second panoramic images may be selected for that particular day.

If there are multiple other runs for a given road segment, (e.g., one in August 2011, one in September 2012, etc.), the panoramic images associated with such runs (as identified by the timestamps) may be queried in groups such that a closest panoramic image along the road segment may be identified for each individual run. In this regard, a plurality of such second images, one for each run, may be selected based on a particular first image. Any such second images may be provided for display to a user in conjunction with the first image. For example, a user, such as user 220, may make a request to view a first panoramic image using a client computing device, such as client computing device 120, by selecting an option to view the first panoramic image, by searching for the first panoramic image by entering a particular location into a search engine, selecting a point on a map corresponding to the 2D or 3D location of the first panoramic image, or in other conventional ways. In response, the client computing device may send a request for or identify the first panoramic image to the one or more server computing devices 110.

The one or more server computing devices may receive the request to identify any second images for the first panoramic image. In one example, any of the selected second images described above may be associated with the first panoramic image such that the server computing device 110, may use the first panoramic image to retrieve any second images. Thus, any second images may be selected in advance by the one or more server computing devices, that is, before the user has requested to view the first image. Alternatively, the selection may be performed in real time (e.g., without delay and in response to the request for or identifying the first panoramic image) in order to keep the closest available images up to date. This may be especially useful as the plurality of images of the storage system 150 may change over time as additional images are collected.

Once identified, the one or more server computing devices may provide the first panoramic image for display, as well as an option to view any of the identified second images for display. For instance, when a user views the first panoramic image, he or she may be provided with an option to view one or more second images in conjunction with the first panoramic image or to switch to a view of one of the second panoramic images. In some examples, any second images, although not immediately displayed may also be provided to the client computing device, before the user has selected the option, in order to allow the client computing device to display them more quickly.

Figure 3:
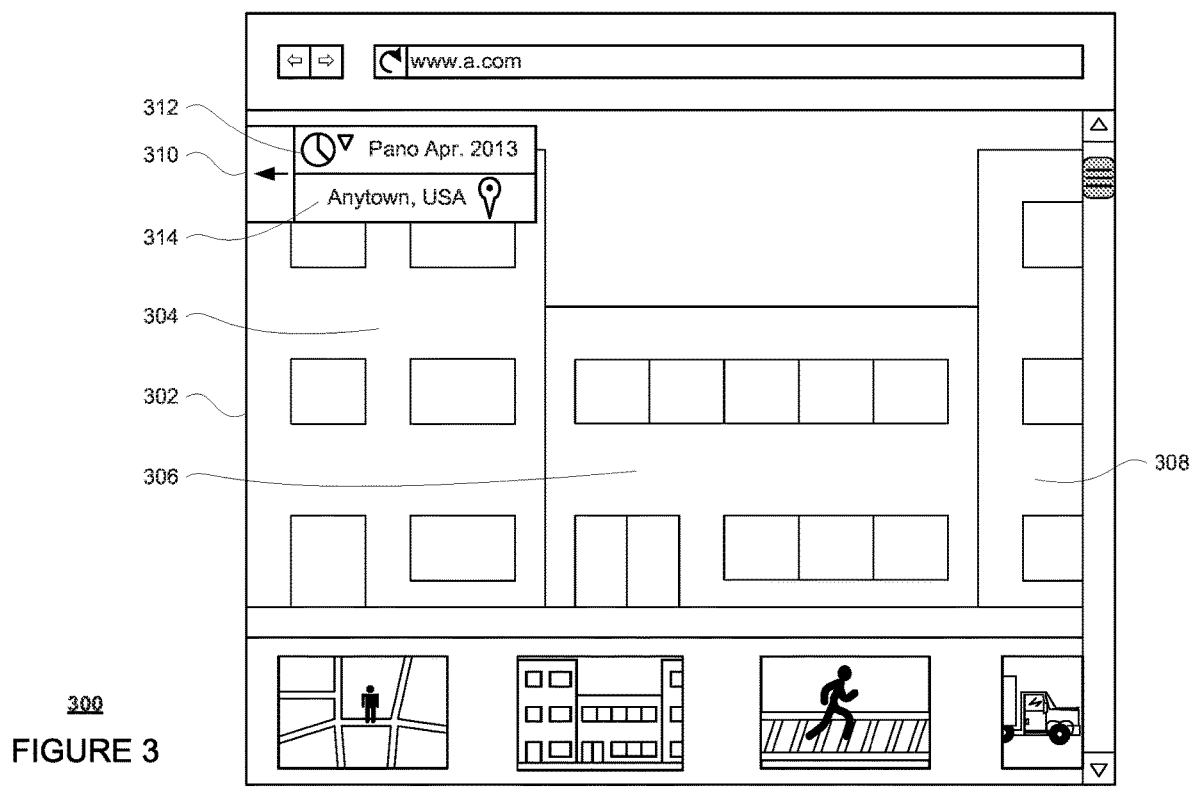
FIG. 3 is a screen shot of a street level map view that may be displayed to a user.

FIG. 3 is an example screen shot 300 which may be displayed to a user, such as user 220, on a display of a client computing device, such as display 122 of client computing device 120. In this example, the screen shot 300 includes a display of a portion of the panoramic image 302, or a view port. This view port includes a particular orientation and zoom level which allows the user to view portions of buildings 304, 306, and 308. In this example, panoramic image 302 may be considered a first panoramic image as described above. The screen shot 300 also includes display box 310 which includes a first part with a clock icon 312 that indicates that a second panoramic image is available for the panoramic image 302. Display box 310 also includes other information such as location data 314 identifying an approximate location of the portion of the panoramic image 302.

By selecting the option to view a second panoramic image, the user may be provided with a display of a portion of a second panoramic image. For example, as shown in example screen shot 400 of FIG. 4, once a user has selected clock icon 312, the display box 310 changes to include a time window 402. Time window 402 includes thumbnail image 404, which may be a portion of a second panoramic image that was selected as having the same snap location as panoramic image 302. In this example, the thumbnail image 404 includes buildings 420, 422, and 424. Here, buildings 424 and 420 may correspond to buildings 304 and 308, respectively of panoramic image 302. However, building 422 does not correspond to building 306, as in this example, building 422 did not exist at the time that panoramic image 302 was captured. Rather, at the time panoramic image 302 was captured, building 422 was replaced by building 306.

Time window 402 may also include a timeline 406 or other selection arrangements which provides a number of different functions. In this example, timeline 406 indicates the quantity of available second images for the panoramic image 302. As there are three points 408, 410, and 412 on the timeline, this may indicate that there are images from at least two different dates that correspond to the location of panoramic image 302. A scroll marker 401 may be used to indicate the date that is currently being displayed within time window 402. For example, point 408, as it is slightly larger than points 410 and 412, indicates that scroll marker 401 is at location 408 and that thumbnail image 404 was captured in 2009. Assuming that image 302 is the most recent image available for the current location, point 412 may indicate that panoramic image 302 was captured in 2013. Point 410 may further indicate that another image, captured sometime between 2009 and 2013 is also available for viewing by the user. Thus, by manipulating scroll marker 401 along timeline 406, the user may view other available panoramic images, including the image corresponding to point 410 as well as panoramic image 302 (corresponding to point 412) in the time window 402. Of course, other timelines may include fewer points than available panoramic images such that locations along the timeline between points may also correspond to available panoramic images, and other such mechanisms may be used to indicate to the user that second images are available.

As the user moves scroll marker 401 along timeline 406 from a first date to a second date, the image displayed in time window 402 transitions from a thumbnail image taken on the first date to a thumbnail image taken on a second date. In accordance with one aspect, the transition between thumbnail images may include animation or effects. For example, as scroll marker 401 is moved from a first date to a second date, a first thumbnail image displayed within time window 402 may begin to fade out, while a second thumbnail image corresponding to the second date may fade in, so as to replace the first thumbnail image. In another example, the movement of scroll marker 401 may cause the first thumbnail image to slide out of view within the time window 402 as the second thumbnail image replaces the first thumbnail image by sliding into view.

Figure 4:
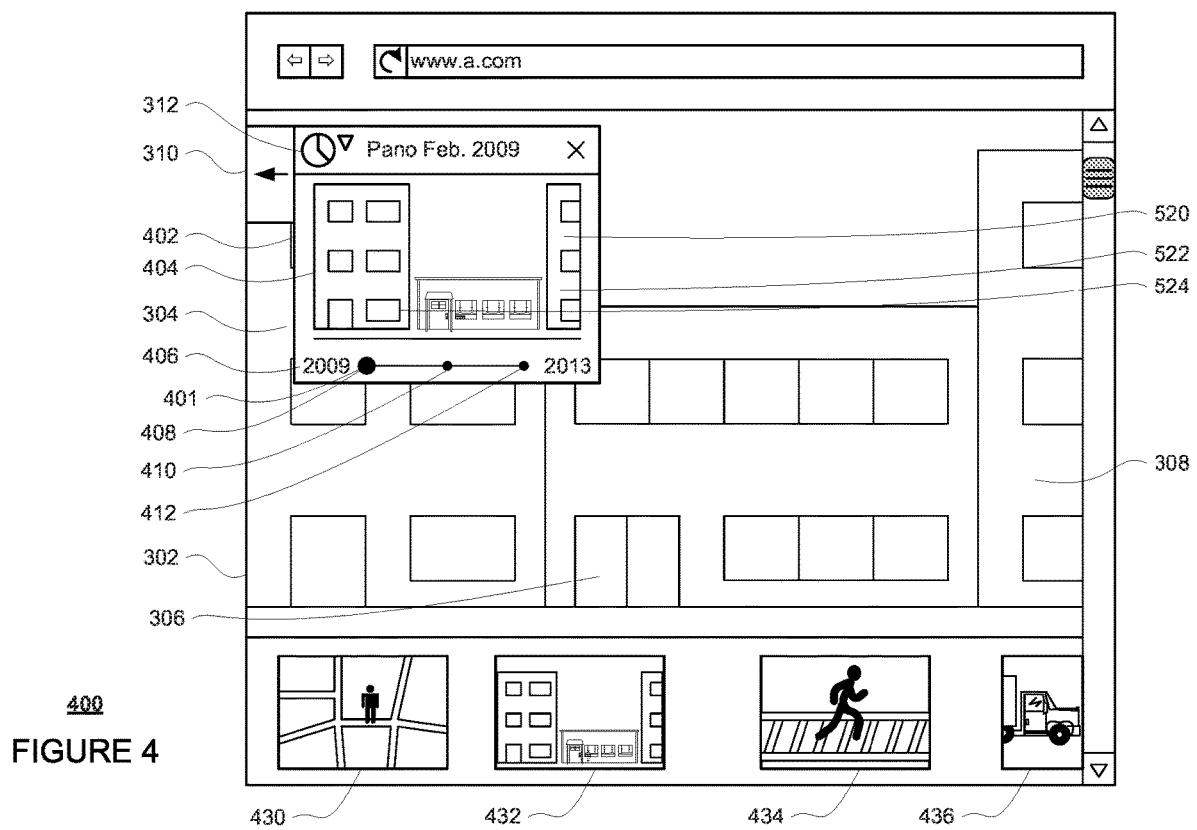
FIG. 4 is a screen shot of a street level view that includes a thumbnail image in accordance with aspects of the disclosure.
Figure 5:
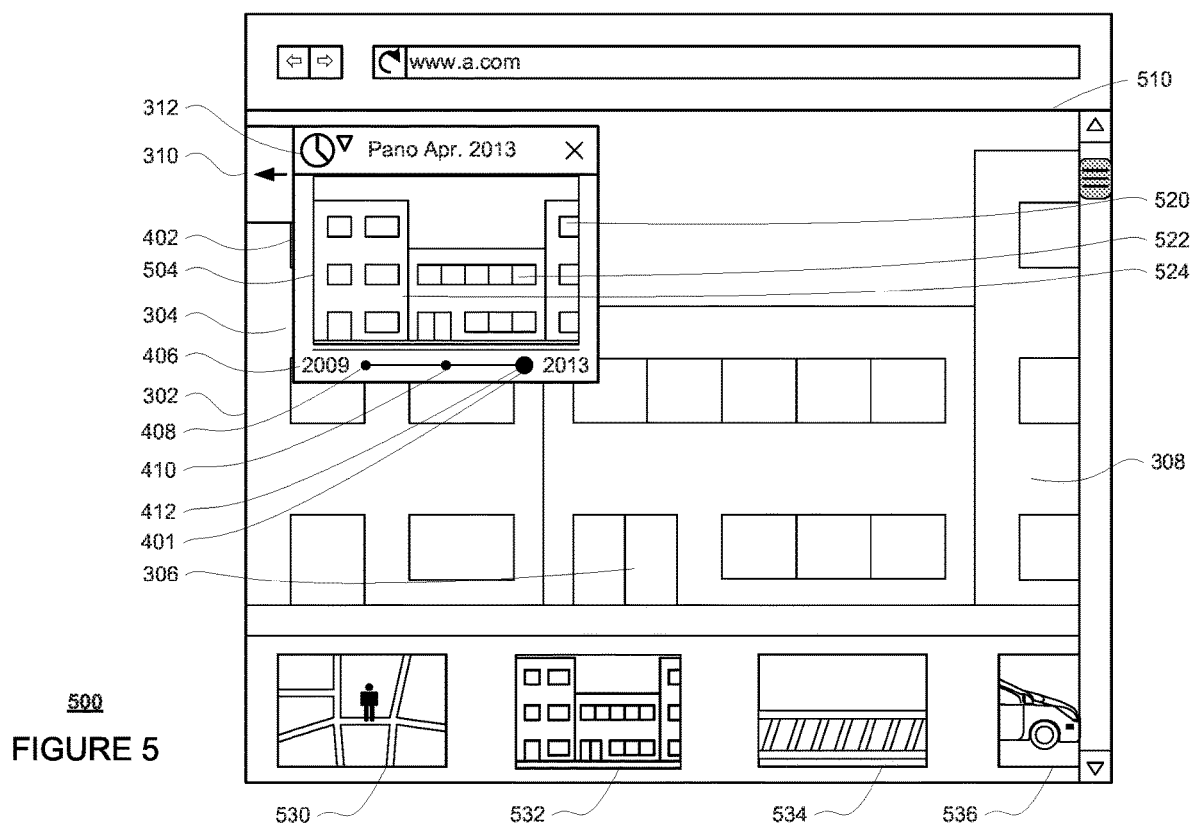
FIG. 5 is a screen shot wherein the thumbnail presents an image that was captured at an earlier date than the street level view.

FIG. 5 shows screenshot 500 in which a user has slid scroll marker 401 to location 412 from location 408 shown in FIG. 4. As scroll marker 401 moves from location 408 to location 412, the time window 402 transitions from showing a thumbnail image 404 that was taken in 2009 to showing a thumbnail image 504 that was taken in 2013. As described above, the transition between these images may include image 404 fading away within time window 402 as scroll marker moves away from location 408. Similarly image 504 may begin fade in within time window 402 as scroll marker 401 approaches location 412. In addition, if any intermediate images are available between 2009 and 2013, time window 402 may also display those intermediate images as scroll marker 401 moves to a location corresponding to the date on which the intermediate image was taken. For example, location 410 may be associated with an image that was taken in the year 2011. As scroll marker 401 moves between location 408 and location 412, time window 402 may transition from image 404 taken in 2009 to an intermediate image taken in 2011, and then transition again from the intermediate image to image 504 taken in 2013.

Since 2013 is the same point in time as panoramic image 302 was captured, thumbnail image 504 may be based on a portion of panoramic image 302 that is displayed in the main viewing area 510. Accordingly, thumbnail image 504 and the displayed portion of panoramic image 302 are the same.

Figure 6:
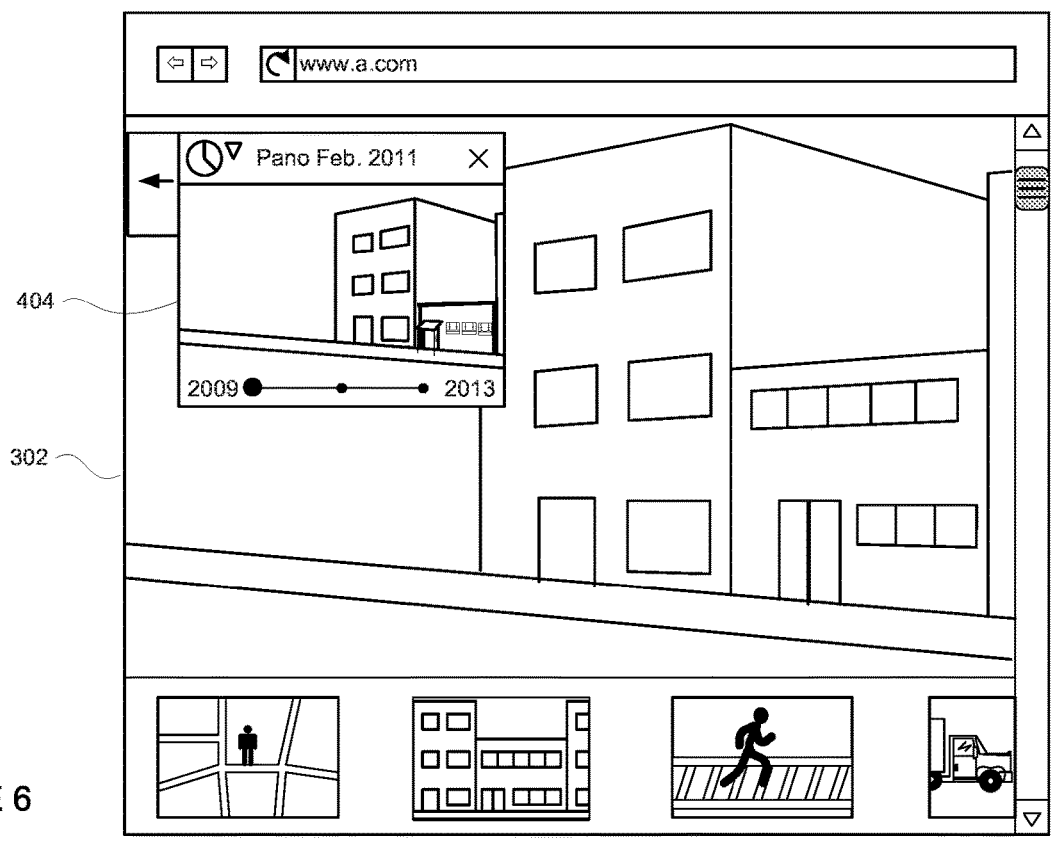
FIG. 6 is a screen shot of a street level view and thumbnail view that has been panned in accordance with aspects of the disclosure.

The location, orientation, and zoom level of the first panoramic image shown in the main viewing area may be used to determine how to display the second thumbnail image within time window 402. For example, in FIG. 4, the displayed snap location, orientation, and zoom level of the second image within time window 402 may be selected in order to correspond to the snap location, orientation, and zoom level of image 302. In addition, if the location, orientation, or zoom level of image 302 changes, the location, orientation, or zoom level of the second image within time window 402 may automatically change as well. For example, if the user pans image 302 to the left by 30 degree, image 404 shown in time window 402 may automatically pan to the left by 30 degrees as well. This can be seen in FIG. 6, wherein the user has panned image 302 to the left, thereby causing image 404 to pan by a corresponding amount, so that images 302 and 404 maintain corresponding orientations. In this way, the user may easily compare panoramic image 302 and thumbnail image 404 from various camera orientations and levels of zoom. Through this comparison, the user may determine how the displayed location has changed between the date thumbnail image 404 was taken and the date panoramic image 302 was taken. For example, the user may compare image panoramic image 302 and thumbnail image 404 of FIG. 4 to determine that that building 306 did not exist in 2009, but was instead building 522. The user may then pan within panoramic image 302, causing an automatic panning of thumbnail image 404, so as to determine if any changes have occurred to other objects in the area, including signs, roadways, buildings, trees, etc. In another aspect, user may pan or zoom within image 404 so as to cause an automatic panning or zooming of image 302.

The three dimensional geometry data associated with a first panoramic image may be used to determine the distance between the point of view of the main viewing area (e.g., where there is no zoom, the point of view would be the actual location of the first panoramic image) to an object within the image. This distance, as well as the three dimensional geometry data associated with the thumbnail image, may then be used to adjust the zoom of the thumbnail image when the thumbnail image is displayed in connection with the first panoramic image. In this regard, the thumbnail image may be displayed such that objects in the thumbnail image will appear to be the same distance from the user as those same objects in the main viewing area of the first panoramic image. For example, as can be seen from screen shot 600 of FIG. 6, the displayed portion of panoramic image 302 corresponds to the displayed portion of panoramic image 404. In this regard, both the orientations of the panoramic images are corresponding as well as the zoom levels, even though they are not necessarily the same.

Similarly, the orientations of two images may be considered to be corresponding even if the two images do not face the exact same direction. For example, orientations may be slightly different depending on the 2D or 3D location of each panoramic image. In particular, if two images were captured at slightly different locations, the system may adjust the orientation of the thumbnail image so that the same object or area is displayed within the center of each image. This adjustment may be based on the three dimensional geometry data that is associated with each image, as well as the distance between the snap location of each image.

Returning to FIG. 4, in addition to panoramic image 302 and thumbnail image 404. The client computing device 120 may display additional related images 430-436. These related images 430-436 may be images that are selected for display due to their relationship to panoramic image 302 or thumbnail image 404. For example, related images 430-436 may be images that represent different perspectives or camera orientations that are available from the same location as images 302 and 404. Related images 430-436 may also include images that depict nearby locations or related objects. For example, if image 302 shows a particular type of restaurant or a particular restaurant chain, related images 430-436 may include images of other locations that contain the same type of restaurant or the same restaurant chain.

In one aspect, related images 430-436 may correspond with the image being displayed in time window 402. Accordingly, as the user moves scroll marker 401 to different locations along timeline 406, related images 430-436 may change so as to display images that corresponds to the time period designated by scroll marker 401. For example, in FIG. 4, scroll marker 401 is at location 408 corresponding to February 2009. Accordingly, one or more of the related images 430-436 may be selected from images that were captured on or around February 2009. In FIG. 5, scroll marker 401 is at location 412, which corresponds to April 2013. Related images 530-536 may therefore be selected from images that were taken on or around April 2013.

Figure 7:
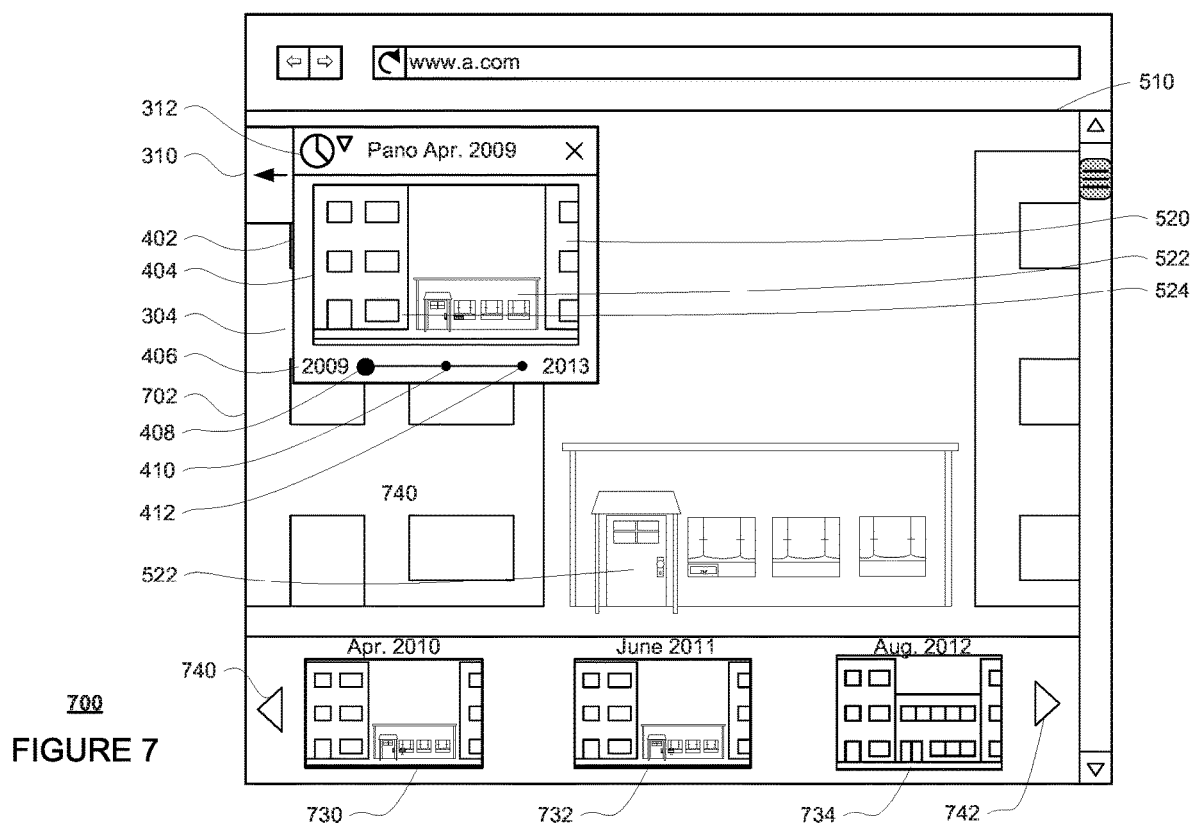
FIG. 7 is a screen shot of the street level view and associated thumbnails displaying images from earlier dates.

In accordance with another aspect, the client user device may display a plurality of related images that were taken at different dates. Similarly to the thumbnail image displayed in time window 402, these related images may correspond to the location, orientation, and zoom level of the first panoramic image displayed in the main viewing area. For example, as shown in screen shot 700 of FIG. 7, related images 730-734 each correspond to the location, orientation, and zoom level of panoramic image 702 and thumbnail image 404. As described above, the location, orientation, and zoom level of the related images 730-734 and panoramic image 702 may each correspond to one another without matching exactly. For example, related images 730-734 and panoramic image 702 may have been captured at slightly different locations, and the orientation and zoom level of related images 730-734 may be adjusted based on this difference in locations. As shown in screen shot 700, each of the related images 730-734 was captured on a different date. Accordingly, a user may easily compare changes that have occurred to a location over a series of dates. The dates of related images may be dependent on the images that are available for the location and orientation being displayed in the main viewing area. Related images 730-734 may include every available image that corresponds to the location and orientation of panoramic image 702 or may include only a subset of available images. For example, related images 730-734 may be selected for display so as to provide no more than one image for a particular interval of time, such as by providing one image for every year.

A visual indicia, such as icons 740 and 742, may be displayed to the user to indicate that additional related images are available. For example, icon 740 indicates that at least one older image is available for the location corresponding to panoramic image 702, and icon 742 indicates that at least one more recent image is available for this location. The user may view the additional images by selecting icon 740 or 742 thereby causing the related image to scroll in the selected direction.

In accordance with one aspect, the user may switch between the displayed thumbnail image and the first panoramic image. For example, a user may select the thumbnail image displayed in the time window 402 or one of the points of timeline 406 using mouse pointer, finger and touchscreen. In response, the client computing device may transition from a display of a first panoramic image to a display of the selected thumbnail image. In between, if needed, the client computing device may request the second paranoramic image from the one or more server computing devices as well. In screen shot 700 of FIG. 7, the user has selected thumbnail image 404, thereby causing main viewing area 510 to display the same image as panoramic image 702.

Figure 8:
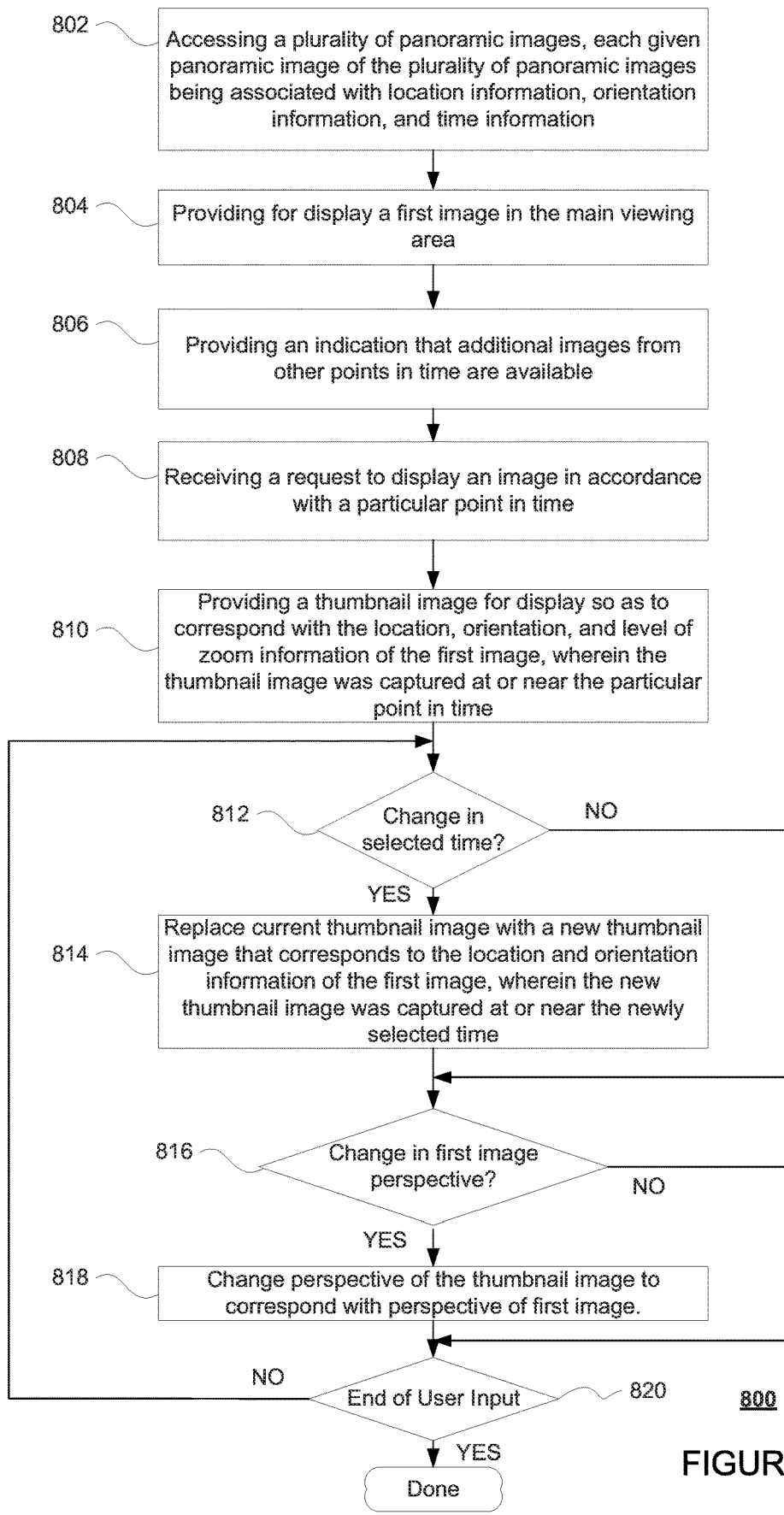
FIG. 8 is a flow diagram describing an example of a method that may be used to implement the aspects of the disclosure.

Flow diagram 800 of FIG. 8 is an example of some of the features described above that may be performed by one or more computing devices, such as computing devices 110, described above. As shown in block 802 of this example, the one or more computing devices access a plurality of panoramic images. Each given panoramic image of the plurality of panoramic images may be associated with multi-dimensional location information defined in at least two dimensions, uni-dimensional (1D) location information defined in only one dimension, three dimensional (3D) geometry data corresponding to a surface of an object depicted in the given panoramic image, and time information identifying when the given panoramic image was captured. At block 804, a first panoramic image, of the plurality of images, is provided for display to a user in a main viewing area. The first image may be provided in connection with a request from a user for a panoramic image that is associated with a particular location. The first panoramic image may be the most recent panoramic image available based on the identified time information. At block 806, the user may be provided with an indication that additional images are available for the particular location associated with the first panoramic image, and that these additional images were captured on dates that are different than the date on which the first panoramic image was captured. For example, a timeline of dates may be displayed, wherein each date indicates that one or more additional images are available for the location of the first panoramic image.

A request from the user may be received, wherein the request identifies a particular date for which a second image is to be displayed (block 808). For example, a user may select a particular date within the displayed timeline. A thumbnail image that was captured at or near the selected date may then be provided for display (block 810). This thumbnail image may be provided for display so that the location, orientation, and level of zoom of the thumbnail image correspond to the location, orientation, and level of zoom of the first image. As stated above, correspondence does not require an exact match. For example, the location of the first image may be determined to correspond to the location of the second image if the two images are within a predetermined distance from one another, such as being within ten feet of one another. Similarly, the orientation of each image may be corresponding if the same geographic area or object appears within the center of each of the images. In addition, the level of zoom of each image may be considered as corresponding to one another if each image appears to be approximately the same distance from the same objects shown in each image.

The user may change the selected time period, by for example, moving a cursor along the displayed timeline from a first date to a second date. If a change in the selected time period is determined (block 812), the thumbnail image may be replaced with a new thumbnail image, wherein the new thumbnail image corresponds to the newly selected date (block 814). The user may also change the perspective of the first image by, for example panning the image to a different orientation or by changing the zoom level of the image. If a change in perspective is determined (block 816), the perspective of the thumbnail image may be automatically changed so that the perspective of the thumbnail image continues to correspond with the perspective of the first image (block 818). Blocks 812-818 may be repeated until the user no longer provides any additional input regarding the selected time period to be displayed or changes to the perspective of the first image.

In accordance with one aspect, the displayed images may be altered based on the date on which the image was captured. In particular, older images may be altered so as to appear as if it has aged relative to more recent images. The apparent aging of the images may be exaggerated relative to actual differences in the time periods for each image. For example, returning to FIG. 4, thumbnail image 404, which was captured in 2009, may be altered to appear as if it has aged in comparison to image 302, which was captured in 2013. These images may be altered by implementing any number of effects, such as by reducing the colors within the image, by adjusting the exposure, or by adding scratches, discolorations, or other imperfections to the image. These alterations may occur through the application of one or more filters. In addition, the alterations for each displayed image may be increased as the user goes back in time within time window 402 by viewing increasingly older images. In this way, the user is provided with an additional indication of the relative age of the displayed images.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method of providing a thumbnail image that corresponds to a main image, the method comprising:
   selecting to display on a graphical interface, by one or more computing devices, the main image at a first geographical location, wherein the main image is associated with imagery of the first geographical location captured from a first orientation and at a first time;
   determining, by the one or more computing devices, one or more thumbnail images based at least in part on the first geographical location, wherein the one or more thumbnail images are each associated with the imagery of the first geographical location captured from an orientation similar to the first orientation and at a time different than the first time;
   generating to display, by the one or more computing devices, the main image and an indication that the one or more thumbnail images each associated with its respective time are available;
   providing to display concurrently with the main image, by the one or more computing devices, a selected one of the one or more thumbnail images;
   receiving, by the one or more computing devices, input representing a change of the main image from a first zoom level to a second zoom level;
   determining a distance between a point of view of a main viewing area of the graphical interface to an object within the main image based on three dimensional geometry data associated with the main image;
   generating, by the one or more computing devices, a corresponding change in zoom level of the selected thumbnail image to the second zoom level, wherein generating the corresponding change in zoom level of the selected thumbnail image to the second zoom level includes adjusting the zoom level of the selected thumbnail image based on the determined distance; and providing to display the selected thumbnail image at the second zoom level, so that the main image and the selected thumbnail image are presented concurrently at the second zoom level.

2. The method of claim 1, wherein the indication that the one or more thumbnail images are available is an icon arranged on the graphical interface.

3. The method of claim 2, wherein the icon is a clock icon.

4. The method of claim 2, wherein:

prior to providing the selected thumbnail image, the method further includes receiving a selection of the icon; and upon receiving the selection, generating a time window for display on the graphical interface, the time window including the selected thumbnail image therein.

5. The method of claim 1, further comprising:

receiving, by the one or more computing devices, input indicating a change of the main image from the first orientation to a second orientation; and generating, by the one or more computing devices, a corresponding change in orientation of the selected thumbnail image to the second orientation.

6. The method claim 1, further comprising providing for display a timeline having a visual indicia of a given time period, wherein the timeline indicates a quantity of available thumbnail images associated with different times during the given time period.

7. The method of claim 6, wherein the timeline indicates at least one of an earliest date and a most current date of the thumbnail images during the given time period.

8. The method of claim 6, wherein the timeline includes a scroll marker indicating a date of the selected thumbnail image.

9. The method of claim 8, wherein, in response to receiving an input for a different point in time, the method includes:

adjusting a location of the scroll marker on the timeline to correspond to the different point in time, and replacing the selected thumbnail image with a different thumbnail image, the different thumbnail image corresponding to the different point in time.

10. A system of providing a thumbnail image that corresponds to a main image, the system comprising one or more computing devices, the one or more computing devices being configured to:

select to display on a graphical interface the main image at a first geographical location, wherein the main image is associated with imagery of the first geographical location captured from a first orientation and at a first time;

determine one or more thumbnail images based at least in part on the first geographical location, wherein the one or more thumbnail images are each associated with the imagery of the first geographical location captured from an orientation similar to the first orientation and at a time different than the first time;

generate to display the main image and an indication that the one or more thumbnail images each associated with its respective time are available;

provide to display, concurrently with the main image, a selected one of the one or more thumbnail images;

receive input representing a change of the main image from a first zoom level to a second zoom level;

determining a distance between a point of view of a main viewing area of the graphical interface to an object within the main image based on three dimensional geometry data associated with the main image;

generate a corresponding change in zoom level of the selected thumbnail image to the second zoom level, wherein generating the corresponding change in zoom level of the selected thumbnail image to the second zoom level includes adjusting the zoom level of the selected thumbnail image based on the determined distance; and provide to display the selected thumbnail image at the second zoom level, so that the main image and the selected thumbnail image are presented concurrently at the second zoom level.

11. The system of claim 10, wherein the one or more computing devices are further configured to generate a time window for display on the graphical interface, the time window including the selected thumbnail image therein.

12. The system of claim 10, wherein the one or more computing devices are further configured to:

receive input indicating a change of the main image from the first orientation to a second orientation; and generate a corresponding change in orientation of the selected thumbnail image to the second orientation.

13. The system claim 10, wherein the one or more computing devices are further configured to provide for display a timeline having a visual indicia of a given time period, the timeline indicating a quantity of available thumbnail images associated with different times during the given time period.

14. The system of claim 13, wherein the timeline includes a scroll marker indicating a date of the selected thumbnail image, and in response to receiving an input for a different point in time, the one or more computing devices are further configured to:

adjust a location of the scroll marker on the timeline to correspond to the different point in time, and replace the selected thumbnail image with a different thumbnail image, the different thumbnail image corresponding to the different point in time.

15. A non-transitory computer-readable storage medium on which computer readable instructions of a program are stored, the instructions, when executed by one or more processors, cause the one or more processors to perform a method, the method comprising:

selecting to display on a graphical interface the main image at a first geographical location, wherein the main image is associated with imagery of the first geographical location captured from a first orientation and at a first time;

determining one or more thumbnail images based at least in part on the first geographical location, wherein the one or more thumbnail images are each associated with the imagery of the first geographical location captured from an orientation similar to the first orientation and at a time different than the first time;

generating to display the main image and an indication that the one or more thumbnail images each associated with its respective time are available;

providing to display concurrently with the main image, a selected one of the one or more thumbnail images;

receiving input representing a change of the main image from a first zoom level to a second zoom level;

determining a distance between a point of view of a main viewing area of the graphical interface to an object within the main image based on three dimensional geometry data associated with the main image;

generating a corresponding change in zoom level of the selected thumbnail image to the second zoom level, wherein generating the corresponding change in zoom level of the selected thumbnail image to the second zoom level includes adjusting the zoom level of the selected thumbnail image based on the determined distance; and providing, to display, the selected thumbnail image at the second zoom level, so that the main image and the selected thumbnail image are presented concurrently at the second zoom level.

16. The non-transitory computer-readable storage medium of claim 15, wherein the method further comprises:
receiving input indicating a change of the main image from the first orientation to a second orientation; and
generating a corresponding change in orientation of the selected thumbnail image to the second orientation.

17. The non-transitory computer-readable storage medium of claim 15, wherein the method further comprises providing for display a timeline having a visual indicia of a given time period, and the timeline indicates a quantity of available thumbnail images associated with different times during the given time period.

* * * * *